United States Patent
Sommer et al.

(10) Patent No.: US 6,393,943 B1
(45) Date of Patent: May 28, 2002

(54) ELECTRONIC-HYDRAULIC CONTROL UNIT FOR AN AUTOMATIC TRANSMISSION FOR VEHICLES

(75) Inventors: Stefan Sommer, Saulgau; Bernhard Fessler, Kressbronn; Holger Bacher, Lindau; Klaus Gessler, Friedrichshafen, all of (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 09/643,917

(22) Filed: Aug. 23, 2000

(30) Foreign Application Priority Data

Sep. 9, 1999 (DE) .......................... 199 43 069

(51) Int. Cl.$^7$ .............................................. F16H 57/02
(52) U.S. Cl. .................................... 74/606 R; 73/118.1
(58) Field of Search ........................ 74/606 R; 73/118.1

(56) References Cited

U.S. PATENT DOCUMENTS

| | | | |
|---|---|---|---|
| 4,271,728 A | 6/1981 | Wakamatsu | 74/866 |
| 5,749,060 A | * 5/1998 | Graf et al. | 701/51 |
| 5,845,544 A | * 12/1998 | Huggins et al. | 74/606 R |

FOREIGN PATENT DOCUMENTS

| | | |
|---|---|---|
| DE | 295 13 950 U1 | 2/1997 |
| EP | 0 697 080 B1 | 5/1994 |
| WO | 97/29305 | 8/1997 |

OTHER PUBLICATIONS

Heintz, Frieder and Erich Zabler. "Einsatzmöglichkeiten und Zukenftschancen "intelligenter" Sensoren im Kraftfahrzeug" in Bosh Technische Berichte, 1990,H.52, S. 30–41.

* cited by examiner

Primary Examiner—Dirk Wright
(74) Attorney, Agent, or Firm—Davis & Bujold, P.L.L.C.

(57) ABSTRACT

The invention is based on an electronic-hydraulic control unit (1) for an automatic transmission of a motor vehicle wherein the control unit (1) has one hydraulic unit (2) with hydraulic valves (4), sensors (6, 7) and pressure regulators (5) and one electronic unit (3) with a microprocessor, memories, sensors and power regulators (9) which form a functional unit. To reduce the tolerances of the control unit, it is proposed that the pressure tolerances appearing in the operating range be detected by verifying characteristic lines and from the divergences relative to a set characteristic line, plotting and storing in a memory a corresponding characteristic line correction.

10 Claims, 1 Drawing Sheet

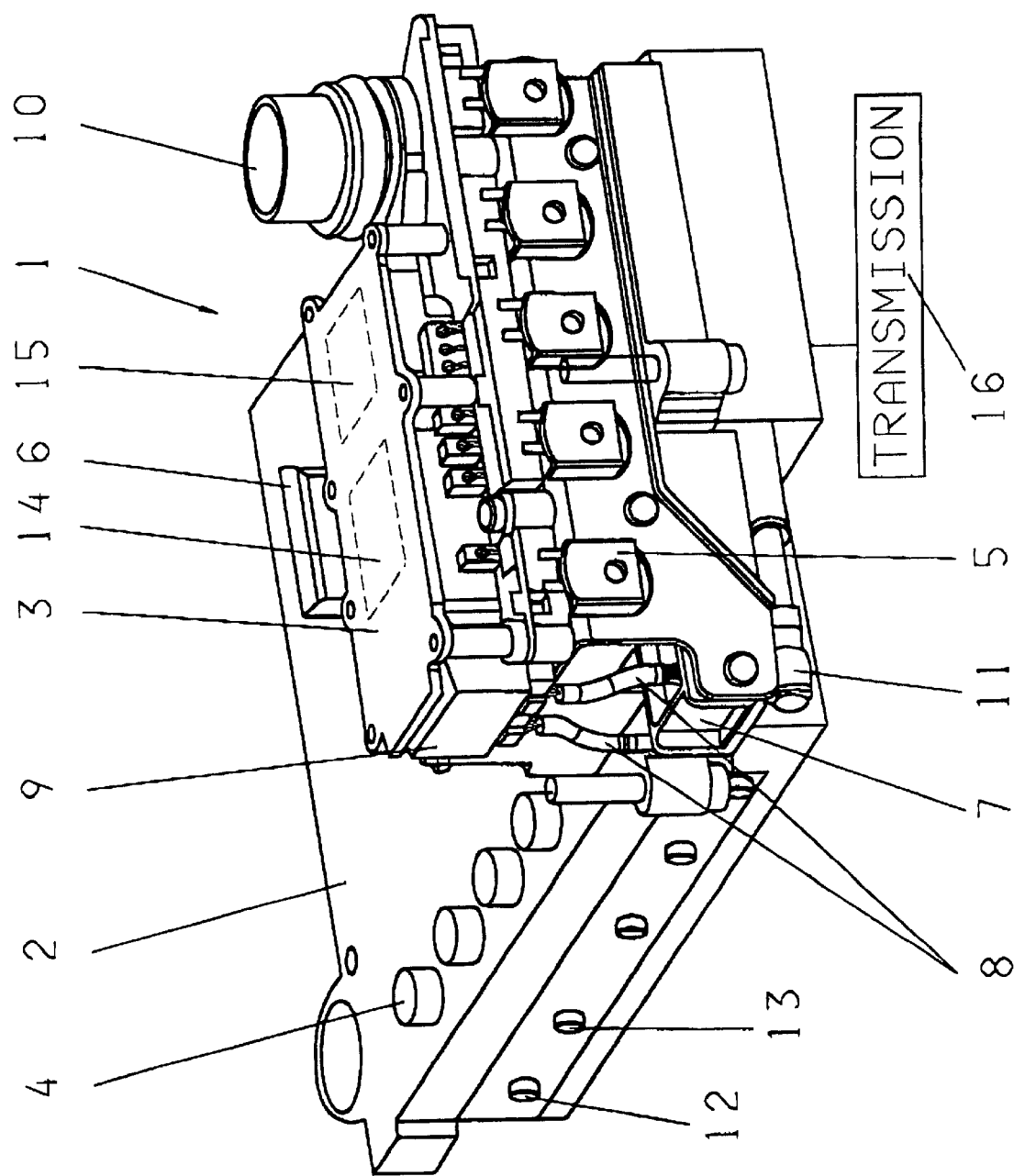

ELECTRONIC-HYDRAULIC CONTROL UNIT FOR AN AUTOMATIC TRANSMISSION FOR VEHICLES

The invention concerns an electronic-hydraulic control unit for an automatic transmission of a motor vehicle.

BACKGROUND OF THE INVENTION

Automatic transmissions are being increasingly used in motor vehicles These can be transmissions having a continuously variable reduction step or multi-step transmissions which can be shifted under load or with traction interruption. To improve the ease when starting and changing the ratio to lower ratio steps in such transmissions, a hydrodynamic converter is often provided. Because of the unfavorable efficiency of the converter, a lock-up clutch is associated, which is engaged in the operating ranges when the converter is no longer needed. In an engaged state, the lock-up clutch transmits the power from an input shaft of the converter to an output shaft.

Associated with the transmission is an electronic hydraulic control unit which selects and activates an adequate ratio, according to the input, driving, and transmission parameters. In addition, the driver can choose, via a selector lever and/or program switch, a ratio step or a group of ratio steps, or driving programs. The control unit comprises one hydraulic unit, which in particular contains hydraulic valves, pressure regulators and sensors, and one electronic unit having electronic modules, which control electric or hydraulic actuators or regulators according to the measured or calculated parameters and/or stored characteristic fields. The hydraulic unit and the electronic unit are conveniently included in the control unit to form a functional unit.

Such control units have been disclosed in U.S. Pat. No. 4,271,728 and EP B1 0 697 080. Due to manufacturing tolerances of the individual elements of the control unit, the necessary working pressures for the hydraulic actuators of the automatic transmission are subject to corresponding tolerances. The tolerance chain which affects the working pressures includes, among others, the individual tolerances of the power regulators, the pressure regulators, the corresponding hydraulic valves, and the sensors required to detect these parameters.

The problem on which the invention is based is to reduce the tolerances of the control unit and, in particular, the scattered coordination of power delivery with working pressure.

SUMMARY OF THE INVENTION

According to the invention, pressure tolerances appearing in the operating range are detected by verifying characteristic lines. In addition, from the divergences in relation to a set characteristic line, a corresponding characteristic line correction is plotted and stored in memory of the electronic unit. Subject to the mating of hydraulics and software or hardware adjusted in each individual hydraulic control unit, it is possible by a measuring technique to fix the tolerances of the control unit over the operating range and compensate them by correction values in the electronic unit software. Since the sensors for detecting the parameters are also subject to tolerances, it is convenient that the tolerances of the sensor signals appearing in the operating range be likewise detected by verifying characteristic lines, and from the divergences relative to a set characteristic line, plot a corresponding characteristic line correction and store in memory of the electronic unit.

BRIEF DESCRIPTION OF THE DRAWINGS

Other advantages result from the description of the drawing that follows. In the drawing is shown one embodiment of the invention The specification and the claims contain numerous features in combination The expert can also conveniently examine each one of the features and make logical additional combinations.

DESCRIPTION OF THE PREFERRED EMBODIMENTS

The only figure shows an inventive control unit in perspective view.

The control unit, which can be lodged in a transmission housing (not shown in detail) of a transmission 16 (only shown diagrammatically) or can form part of the transmission housing in the form of a cover, comprises one hydraulic unit 2 and one electronic unit 3. The hydraulic unit 2 and the electronic unit 3 are combined to form a functional unit. In or on the hydraulic unit 2, hydraulic valves 4 and pressure regulators 5 are provided which are controlled by the electronic unit 3 via signal lines, e.g. electric lines 8. There are also disposed on the control unit 1 several sensors, such as rotational speed sensors 6, to detect different rotational speeds of the transmission, and a position sensor 7. to detect the position of a shift valve 11 with which the driver can select ratio ranges and/or operating modes via a selector lever (not shown). Other pressure sensors 12 and temperature sensors 13 can be provided on the hydraulic unit 2.

The electronic unit 3 has electronic modules (not shown in detail), such as a microprocessor 14, one or more memories 15 of usual design in which programs, characteristic values, characteristic lines or characteristic fields are stored. Depending on the values stored and on the sensor signals, the electronic unit 3 generates, via its power regulator 9, output signals for control of the hydraulic valves 4, of the pressure regulators 5, and of other electric or hydraulic actuators (not individually shown). The control unit 1 has a holding fixture 10 for a central plug through which it is connected with a power supply and other control units for other aggregates of the vehicle.

Prior to being installed in the transmission, the completely assembled control unit 1 is measured on a test bench where divergences are found from the characteristic lines determined by the manufacturing process. The divergences found over the operating range are compensated by correction values which are stored in memory of the electronic unit 3. The divergences of the control unit I from the set characteristic line are thus minimized so that control units 1 produced, according to the same process, only slightly diverge from each other in the series.

| Reference numerals | |
|---|---|
| 1 control unit | 9 power regulator |
| 2 hydraulic unit | 10 holding fixture for a central plug |
| 3 electronic unit | 11 shift valve |
| 4 hydraulic valve | 12 pressure sensor |
| 5 pressure regulator | 13 temperature sensor |
| 6 rotational speed sensor | 14 microprocessor |
| 7 position sensor | 15 memory |
| 8 electric line | 16 transmission |

What is claimed is:

1. An electronic-hydraulic control unit (1) for an automatic transmission of a motor vehicle, the control unit (1) comprising:

a hydraulic unit (2) having a plurality of sensors (6, 7), at least one hydraulic valve (4), and at least one pressure regulator (5); and an electronic unit (3) having a microprocessor (31), a memory (33), and a power regulator (9), and the electronic unit (3) being coupled to the hydraulic unit (2) for control thereof;

wherein the hydraulic unit (2) and the electronic unit (3) are combined with one another to form a functional unit, and, prior to installing the control unit (1) on the automatic transmission, pressure values of the hydraulic unit (2), within an operating range of the hydraulic unit (2), are measured and compared with a selected characteristic line and, based upon any divergence of the measured pressure values of the hydraulic unit (2) from the selected characteristic line, a corresponding correction characteristic line is plotted and stored in the memory (33) of the electronic unit (3) for use by the electronic unit (3), during operation of the vehicle, to compensate for manufacturing tolerances of the hydraulic unit (2).

2. The control unit (1) according to claim 1, wherein the correction characteristic line, plotted and stored in the memory (33) of the electronic unit (3), is based upon a divergence, appearing within an operating range of the hydraulic unit (2), of at least one sensor signal with respect to the selected characteristic line.

3. The control unit (1) according to claim 1, wherein at least one of the plurality of sensors is a rotational speed sensor (6).

4. The control unit (1) according to claim 1, wherein at least one of the plurality of sensors is a sensor which detects a position of a shift valve (11) of the automatic transmission.

5. The control unit (1) according to claim 1, wherein the control unit (1) further comprises a shift valve (11) by which a driver can select a desired ratio range.

6. The control unit (1) according to claim 1, wherein the control unit (1) further comprises a lever by which a driver can select a desired operating mode.

7. An electronic-hydraulic control unit (1) for an automatic transmission of a motor vehicle, the control unit (1) comprising:

a hydraulic unit (2) having a plurality of sensors (6, 7), at least one hydraulic valve (4), and at least one pressure regulator (5); and an electronic unit (3) having a microprocessor (31), a memory (33), and a power regulator (9), and the electronic unit (3) being coupled to the hydraulic unit (2) for control thereof;

wherein the hydraulic unit (2) and the electronic unit (3) are combined with one another to form a functional unit, and, prior to installing the control unit (1) on the automatic transmission, pressure values of the hydraulic unit (2), within an operating range of the hydraulic unit (2), are measured and compared with a selected characteristic line and, based upon any divergence of the measured pressure values of the hydraulic unit (2) from the selected characteristic line, a corresponding correction characteristic line is plotted and stored in the memory (33) of the electronic unit (3) for use by the electronic unit (3), during operation of the vehicle, to compensate for manufacturing tolerances of the hydraulic unit (2);

the correction characteristic line, plotted and stored in the memory (33) of the electronic unit (3), is based upon the divergence, appearing within an operating range of the hydraulic unit (2), of at least one sensor signal with respect to the selected characteristic line;

at least one of the plurality of sensors is a rotational speed sensor (6); and at least one of the plurality of sensors is a sensor which detects a position of a shift valve (11) of the automatic transmission.

8. The control unit (1) according to claim 7, wherein the control unit (1) further comprises a shift valve (11) by which a driver can select a desired ratio range.

9. The control unit (i) according to claim 7, wherein the control unit (1) further comprises a lever by which a driver can select a desired operating mode.

10. A method of installing an electronic-hydraulic control unit (1) on an automatic transmission of a motor vehicle, method comprising the steps of:

providing a hydraulic unit (2) with a plurality of sensors (6, 7), at least one hydraulic valve (4), and at least one pressure regulator (5);

providing an electronic unit (3) with a microprocessor (31), a memory (33), and a power regulator (9), and electronically coupling the electronic unit (3) to the hydraulic unit (2) to facilitate control thereof;

combining the hydraulic unit (2) with the electronic unit (3) to form a functional unit;

prior to installing the control unit (1) on the automatic transmission, measuring pressure values of the hydraulic unit (2), within an operating range of the hydraulic unit (2), and comparing the measured pressure values with a selected characteristic line;

based upon any divergence of the measured pressure values of the hydraulic unit (2) from the selected characteristic line, plotting and storing a corresponding correction characteristic line in the memory (33) of the electronic unit (3) for use by the electronic unit (3); and during operation of the vehicle, compensating for manufacturing tolerances of the hydraulic unit (2) by using the correction characteristic line stored in memory.

* * * * *